(12) United States Patent
Yamamoto et al.

(10) Patent No.: US 11,548,250 B2
(45) Date of Patent: Jan. 10, 2023

(54) METHOD AND DEVICE FOR FORMING PNEUMATIC TIRE

(71) Applicant: The Yokohama Rubber Co., LTD., Tokyo (JP)

(72) Inventors: Osamu Yamamoto, Hiratsuka (JP); Atsushi Tanaka, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 320 days.

(21) Appl. No.: 16/331,130

(22) PCT Filed: Sep. 1, 2017

(86) PCT No.: PCT/JP2017/031546
§ 371 (c)(1),
(2) Date: Mar. 6, 2019

(87) PCT Pub. No.: WO2018/047731
PCT Pub. Date: Mar. 15, 2018

(65) Prior Publication Data
US 2019/0217564 A1    Jul. 18, 2019

(30) Foreign Application Priority Data

Sep. 6, 2016    (JP) .............................. JP2016-173540

(51) Int. Cl.
*B29D 30/32*    (2006.01)
*B29D 30/24*    (2006.01)

(52) U.S. Cl.
CPC ........... *B29D 30/244* (2013.01); *B29D 30/24* (2013.01); *B29D 30/32* (2013.01); *B29D 2030/3214* (2013.01); *B29D 2030/3221* (2013.01)

(58) Field of Classification Search
CPC .... B29D 30/24; B29D 30/244; B29D 30/245; B29D 30/246; B29D 30/247; B29D 30/248; B29D 30/32; B29D 2030/3214
See application file for complete search history.

(56) References Cited

U.S. PATENT DOCUMENTS 3,598,673 A * 8/1971 Caretta ................ B29D 30/247
156/132
3,645,826 A * 2/1972 Henley ................ B29D 30/247
156/401

(Continued)

FOREIGN PATENT DOCUMENTS

JP    S46-000934    9/1971
JP    H06-055664    3/1994

(Continued)

OTHER PUBLICATIONS

Abstract and Machine translation of JP-2016-043521, patent document published Apr. 4, 2016.*

(Continued)

*Primary Examiner* — Geoffrey L Knable
(74) *Attorney, Agent, or Firm* — Thorpe North & Western (57) ABSTRACT

A tire is formed by disposing a cylindrical band member on a forming drum and outer circumferential sides of side portions disposed on both sides of the forming drum in a drum axial direction; expanding in diameter the forming drum and moving the side portions closer together in the drum axial direction; making step portions formed in the band member conform to side surfaces of the forming drum; moving bead members toward the step portions and compression-bonding the bead members to the band member on the side surfaces of the forming drum; and using a turn-up mechanism to wrap the bead members by turning up both (Continued)

end portions of the band member in the drum axial direction to form an intermediate green tire.

2 Claims, 9 Drawing Sheets

(56) References Cited

U.S. PATENT DOCUMENTS

| | | | | |
|---|---|---|---|---|
| 3,698,987 | A | * | 10/1972 | Woodhall et al. ..... B29D 30/32 156/401 |
| 3,844,871 | A | * | 10/1974 | Habert ............... B29D 30/3007 156/362 |
| 3,929,546 | A | * | 12/1975 | Katagiri ............... B29D 30/245 156/417 |
| 6,004,414 | A | * | 12/1999 | Tabuchi ............. B29D 30/2607 156/131 |
| 6,360,802 | B1 | * | 3/2002 | Baldoni ............... B29D 30/245 156/415 |
| 6,457,505 | B1 | * | 10/2002 | Byerley ............... B29D 30/246 156/417 |
| 2006/0102272 | A1 | | 5/2006 | Iyanagi et al. |
| 2009/0272484 | A1 | * | 11/2009 | Seevers .............. B29D 30/2607 156/118 |
| 2010/0000662 | A1 | | 1/2010 | Onimatsu |
| 2012/0111480 | A1 | * | 5/2012 | Baldoni ............... B29D 30/244 156/110.1 |
| 2016/0176138 | A1 | | 6/2016 | Roa Guzman |

FOREIGN PATENT DOCUMENTS

| | | |
|---|---|---|
| JP | H10-258467 | 9/1998 |
| JP | 2010-012670 | 1/2010 |
| JP | 2012-520188 | 9/2012 |
| JP | 2016-043521 | 4/2016 |
| JP | 2016-117284 | 6/2016 |
| JP | 2012-086487 | 5/2017 |
| WO | WO 2004/012928 | 2/2004 |
| WO | WO 2010/103393 | 9/2010 |

OTHER PUBLICATIONS

Abstracts and Machine translation of JP-06-055664, patent document published Mar. 1, 1994.*
International Search Report for International Application No. PCT/JP2017/031546 dated Nov. 14, 2017, 4 pages, Japan.

* cited by examiner

METHOD AND DEVICE FOR FORMING PNEUMATIC TIRE

TECHNICAL FIELD

The present technology relates to a method and device for forming a pneumatic tire and particularly to a method and device for forming a pneumatic tire that can provide improved tire quality, the method and device reducing work and achieving precise compression-bonding of a bead member at a predetermined position when compression-bonding a bead member to a band member on a side surface of a forming drum.

BACKGROUND ART

Pneumatic tires are manufactured by vulcanizing an unvulcanized green tire. When forming a green tire, for example, an intermediate green tire is formed, the intermediate green tire including a cylindrical band member of a carcass member disposed on the outer circumferential side of an innerliner and a pair of bead members disposed on both end portions of the band member in the cylinder axial direction (see Japan Unexamined Patent Publication No. H10-258467, for example). Next, a belt member and the like are bonded on the outer circumferential surface of the intermediate green tire and the green tire is formed.

In forming an intermediate green tire, as described in paragraphs [0034] and [0035] of Japan Unexamined Patent Publication No. H10-258467, by expanding the diameter of the forming drum around which a ply (band member) is wound, a step is formed at the interface between bladders connected to both ends of the forming drum and the forming drum. Accordingly, a step is also formed in the plies disposed on this step. The bead member is installed by being pushed against the step formed in the ply.

In such a known method, the ply may not sufficiently deform in accordance with the side surface of the expanded forming drum and separate from the side surface. As a result, a gap may form between the step formed between the bladder and the forming drum and the step formed in the ply. This may cause variation in the position where the installed bead member compression-bonds to the ply and may cause the area of the step formed in the ply to be expanded unevenly due to the installed bead member. When these occur, the quality (uniformity, etc.) of the manufactured tire is affected. By using a stitcher in the area of the step formed in the ply to bond together the step, formed between the bladder and the forming drum, to the ply, the gap between both of these steps may be fixed. However, additional work using such a stitcher is required.

SUMMARY

The present technology provides a method and device for forming a pneumatic tire that can provide improved tire quality, the method and device reducing work and achieving precise compression-bonding of a bead member at a predetermined position when compression-bonding a bead member to a band member on a side surface of a forming drum.

A method for forming a pneumatic tire according to an embodiment of the present technology includes:

disposing a cylindrical band member on an outer circumferential side of an expandable and contractible forming drum and on outer circumferential sides of side portions disposed on both sides of the forming drum in a drum axial direction;

forming step portions in the band member by expanding the forming drum in diameter;

compression-bonding bead members on side surfaces of the forming drum by moving the bead members toward the step portions;

forming an intermediate green tire by wrapping the bead members by turning up both end portions of the band member in the drum axial direction; and forming a green tire by bonding a remaining member to the intermediate green tire; wherein the step portions of the band member are made to conform to the side surfaces of the forming drum by moving the side portions closer together in the drum axial direction in sync with a diameter-expanding operation of the forming drum.

A device for forming a pneumatic tire according to an embodiment of the present technology includes:

an expandable and contractible forming drum; and side portions and turn-up mechanisms disposed on both sides of the forming drum in a drum axial direction; wherein with a cylindrical band member being disposed on an outer circumferential side of the forming drum and on outer circumferential sides of the side portions, the forming drum is expanded in diameter to form step portions in the band member;

bead members moved toward the step portions are compression-bonded to the band member on side surfaces of the forming drum;

an intermediate green tire is formed by wrapping the bead members by turning up both end portions of the band member by the turn-up mechanisms in the drum axial direction; and the side portions are moved closer together in the drum axial direction in sync with a diameter-expanding operation of the forming drum.

According to the present technology, by the diameter-expanding operation of the forming drum being in sync with the movement of the side portions closer together in the drum axial direction, the step portions formed in the band member deform in accordance with the side surfaces of the forming drum. Thus, the gap between the step portion and the side surface of the forming drum is reduced, and variation in the position where the bead member compression-bonds with the band member is suppressed. Furthermore, the step portion can be prevented from being unevenly extended by the compression-bonding of the bead member. This is advantageous in improving the quality of manufactured tires. Additional work using a stitcher or the like to reduce the gap between the step portion formed in the band member and the side surface of the forming drum is not required.

DETAILED DESCRIPTION

A method and a device for forming a pneumatic tire according to embodiments of the present technology will be described below with reference to the drawings.

Figure 1:
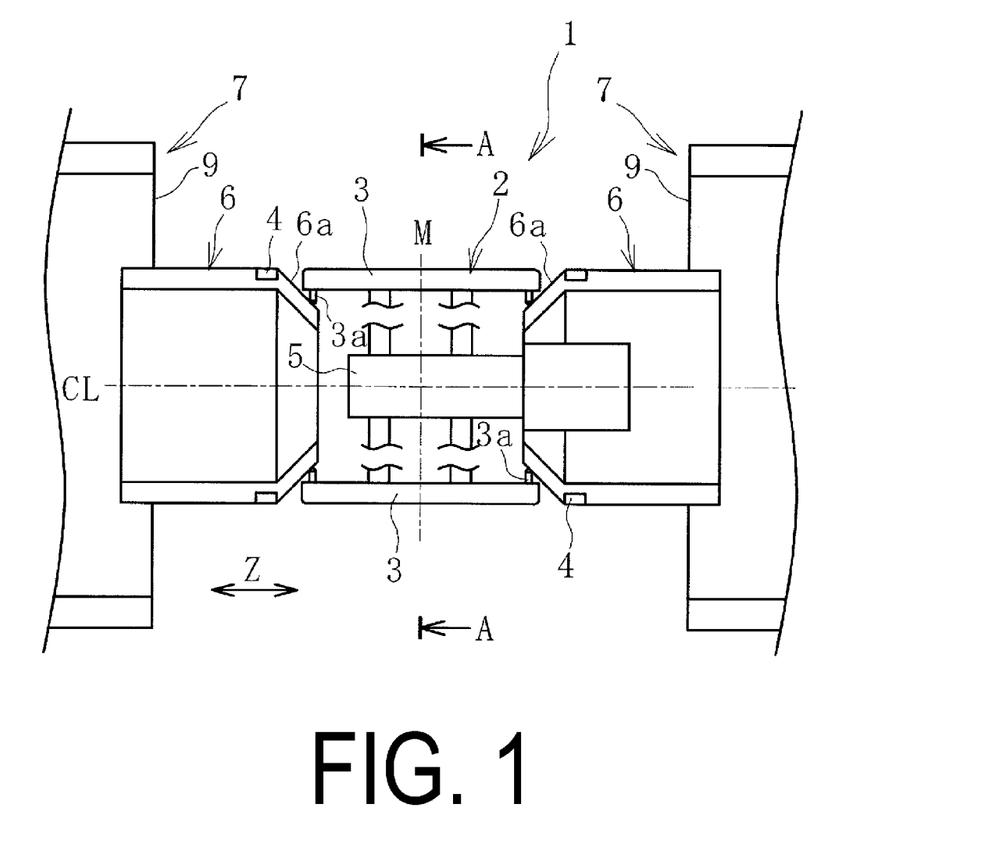
FIG. 1 is an explanatory diagram illustrating a device for forming a pneumatic tire according to an embodiment of the present technology in a cross-sectional view.
Figure 2:
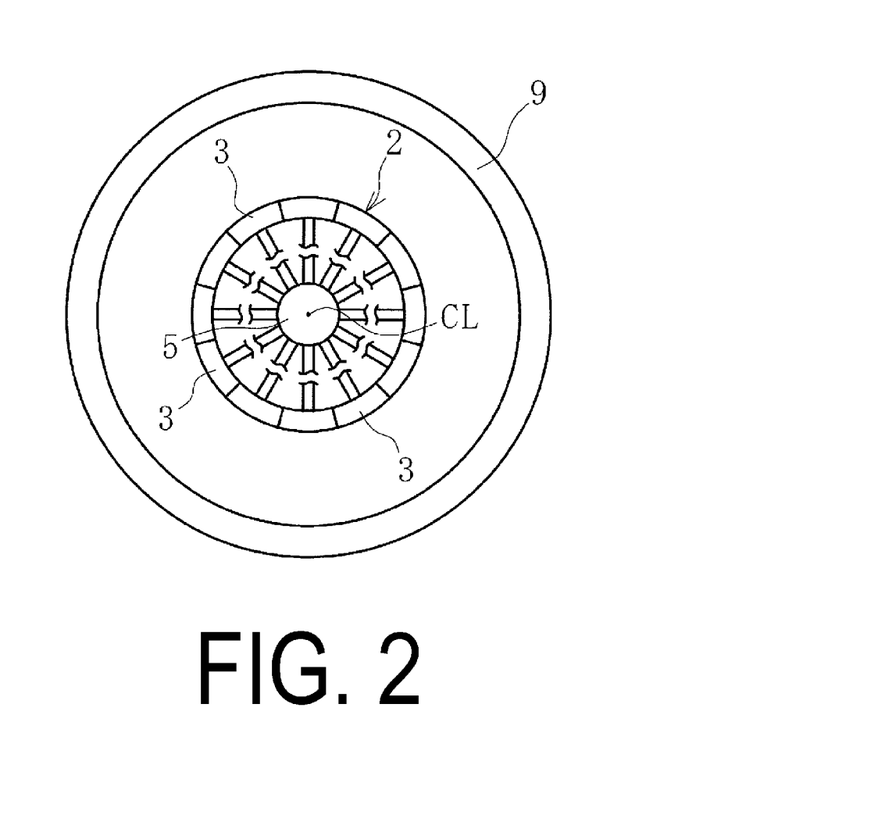
FIG. 2 is an explanatory diagram illustrating the forming device of FIG. 1 viewed in a cross section A-A.
Figure 8:
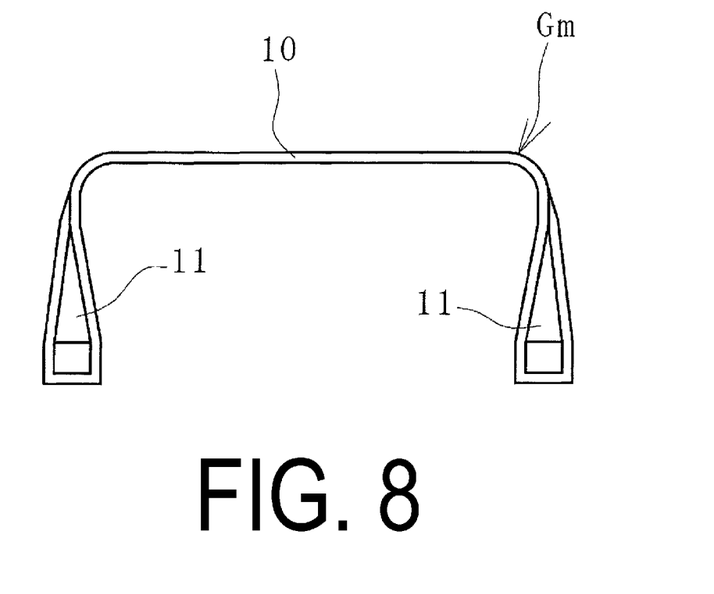
FIG. 8 is an explanatory diagram illustrating a formed intermediate green tire as viewed in a cross section.

An intermediate green tire Gm illustrated in FIG. 8 is formed by using a device 1 for forming a pneumatic tire (hereinafter referred to as forming device 1) according to an embodiment of the present technology illustrated in FIGS. 1 and 2. The intermediate green tire Gm includes a cylindrical band member 10 and a pair of bead members 11 disposed at both end portions of the band member 10 in the cylinder axial direction. The band member 10 includes an innerliner and a carcass material layered on the outer circumferential side of the innerliner.

The forming device 1 includes an expandable/contractible forming drum 2, side portions 6, and turn-up mechanisms 7 disposed on both sides of the forming drum 2 in the drum axial direction. In the drawings, the drum axial direction is indicated by the arrow Z, the axial center position of the forming drum 2 is indicated by CL, and the center position in the width direction of the forming drum 2 is indicated by M.

The forming drum 2 includes a center shaft 5 and a plurality of segments 3 disposed in an annular shape around the center shaft 5. Each of the segments 3 has an arc shape in a cross-sectional view, and the center shaft 5 and the inner circumferential surfaces of the segments 3 are connected, for example, by a link mechanism. This allows the cylindrical forming drum 2 to expand and contract. One end portion of the center shaft 5 is connected to a motor, and the forming drum 2 is cantilevered. The forming drum 2 rotates by the center shaft 5 being rotationally driven. In this embodiment, each of the segments 3 includes a projection portion 3a that projects radially inward on the inner circumferential surface.

The side portion 6, for example, is a cylindrical body with an outer diameter substantially identical to the outer diameter of the forming drum 2 when fully contracted in diameter. In this embodiment, each of the inner end portions of the side portions 6 in the drum axial direction is formed into a tapered shape that decrease in diameter as it extends inward in the drum axial direction. In other words, each of the inner end portions of the side portions 6 in the drum axial direction includes a tapered surface 6a that is continuous in the circumferential direction. The inclination angle of the tapered surface 6a with respect to the drum axial direction is set to approximately 45° (for example, from 40° to 50°). The side portions 6 move in the drum axial direction.

A bead lock portion 4 is provided at the interface between the flat outer circumferential surface of the side portion 6 in a cross-sectional view and the tapered surface 6a. The bead lock portion 4 moves in the radial direction and stops at a lock position on the outer circumference side and a standby position on the inner circumferential side. The bead lock portion 4 at the lock position holds the bead member 11.

The turn-up mechanism 7 includes an expandable and contractible turn-up bladder 8 and a cylindrical pusher ring 9. The turn-up bladder 8 is installed in the side portion 6, for example, in a contracted state. The pusher ring 9 moves in the drum axial direction in a state of being externally fitted on the side portion 6. The turn-up mechanism 7 is not limited to such a configuration and can have one of various known specifications.

Next, steps of a method for forming a pneumatic tire according to an embodiment of the present technology will be described. The forming device 1 is a structure with left-right symmetry. In FIGS. 3 to 7, only the left half is illustrated. The right half of the forming device 1 operates similar to the left half.

Figure 3:
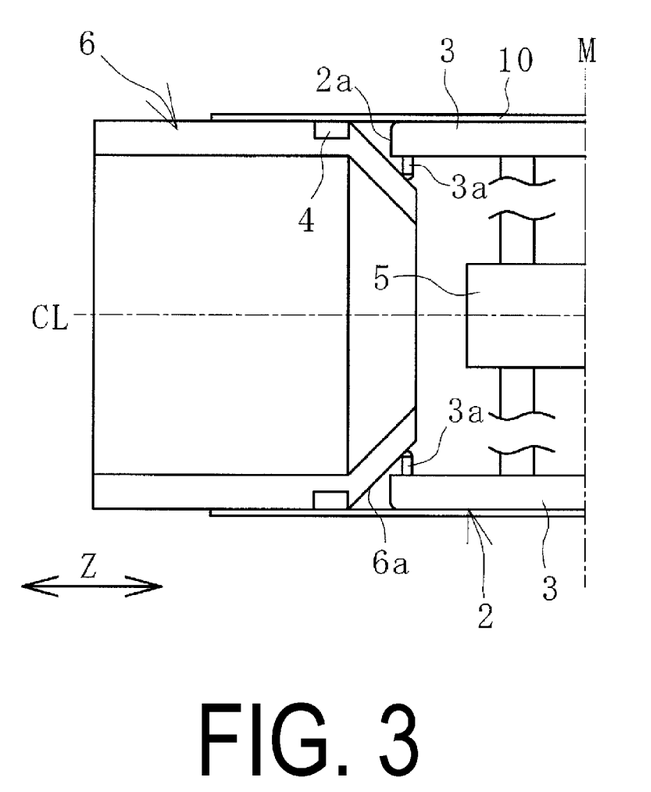
FIG. 3 is an explanatory diagram illustrating the left half of the forming device of FIG. 1 with a band member wound around the outer circumferential surface.

Firstly, as illustrated in FIG. 3, the cylindrical band member 10 is placed on the outer circumferential side of the forming drum 2 and the outer circumferential side of each of the side portions 6. Specifically, the band member 10 is wound around the outer circumferential surface of the forming drum 2 (each of the segments 3) and the outer circumferential surface of each of the side portions 6, with the innerliner being on the inner circumferential side. At this stage, the forming drum 2 is in a contracted state, and the outer circumferential surface of the forming drum 2 and the outer circumferential surface of each of the side portions 6 are substantially in the same position in the radial direction. The projection portions 3a of the segments 3 are in contact with the tapered surfaces 6a of the side portions 6. The bead lock portion 4 is stopped at the standby position.

At this stage, the band member 10 is in contact with the outer circumferential surface of the forming drum 2 and the outer circumferential surface of each of the side portions 6. However, the tapered surfaces 6a and the band member 10 are not in contact with one another (a gap is present).

Figure 4:
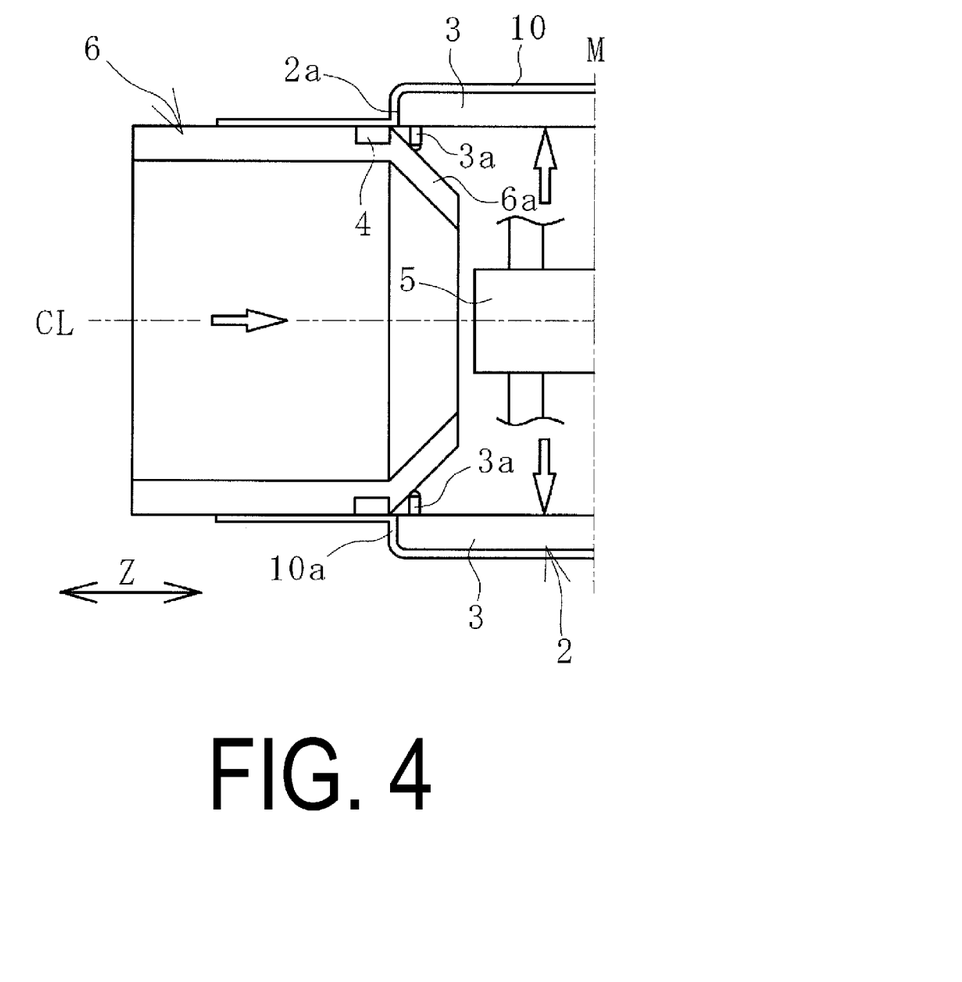
FIG. 4 is an explanatory diagram illustrating a state in which the forming drum of FIG. 3 is expanded in diameter and the side portions are moved closer together.

Next, as illustrated in FIG. 4, the segments 3 are moved to the outer circumferential side to expand the diameter of the forming drum 2, and the side portions 6 are moved in the drum axial direction to bring the side portions 6 closer together. In this embodiment, by moving the side portions 6 closer together in the drum axial direction, the projection portion 3a moves to the outer circumferential side along the tapered surface 6a while in contact with the tapered surface 6a of the side portion 6. As the projection portion 3a moves, the segments 3 move to the outer circumferential side, and the forming drum 2 expands in diameter. In other words, by utilizing the projection portion 3a and the tapered surface 6a, a structure in which the diameter-expanding operation of the forming drum 2 and the movement of the side portions 6 in the drum axial direction are in sync with one another can be achieved.

For the projection portion 3a to move smoothly along the tapered surface 6a, for example, a free-rotating roller is preferably provided at the end of the projection portion 3a. Alternatively, on at least one side of the surfaces of contact between the projection portion 3a and the tapered surface 6a, a low-friction material made of fluororesin or the like is preferably employed.

As illustrated in FIG. 4, the forming drum 2 expands without the outer diameter of each of the side portions 6 changing to form a step portion 10a in the band member 10. Furthermore, because the side portions 6 move toward the forming drum 2 in the drum axial direction in sync with the expansion of the diameter of the forming drum 2, the step portion 10a deforms in accordance with a side surface 2a of the forming drum 2 and comes into contact with the side surface 2a. This configuration is advantageous in reducing work because additional work using a stitcher or the like to reduce the gap between the step portion 10a and the side surface 2a of the forming drum 2 is not required.

For example, in a configuration in which the forming drum 2 expands in diameter without the side portions 6 moving in the drum axial direction, a large gap between the side surface 2a and the step portion 10a is formed because the step portion 10a formed in the band member 10 does not conform with the side surface 2a of the forming drum 2. A significant advantageous feature of the present technology is that the gap between the step portion 10a formed in the band member 10 and the side surface 2a of the forming drum 2 can be minimized.

Figure 5:
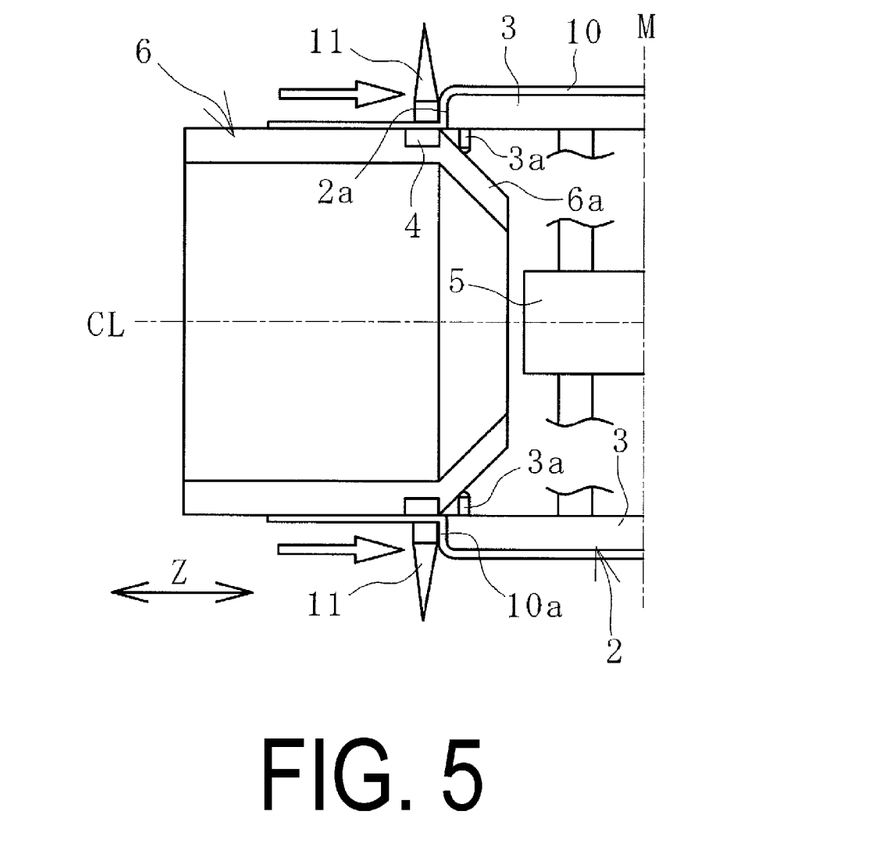
FIG. 5 is an explanatory diagram illustrating a state in which the bead member is compression-bonded to the band member on the side surface of the forming drum of FIG. 4.

Next, the annular bead member 11 illustrated in FIG. 5 is externally fitted on the side portion 6 and moved toward the step portions 10a in the drum axial direction. In this way, the bead member 11 is compression-bonded to the band member 10 on the side surface 2a of the forming drum 2.

When the gap between the step portion 10a and the side surface 2a of the forming drum 2 is great, the position where the bead member 11 moved in the drum axial direction comes into initial contact with the band member 10 is likely to vary. In addition, when the bead member 11 in contact with the band member 10 is compression-bonded on the side surface 2a of the forming drum 2 with a gap present, the step portion 10a may be unevenly extended by the bead member 11. However, in the present technology, the gap between the step portion 10a and the side surface 2a of the forming drum 2 is small. Thus, variation in the position where the bead member 11 is compression-bonded to the band member 10 can be suppressed, and compression-bonding can be performed at the predetermined position with precision. Additionally, the step portion 10a can be prevented from being unevenly extended by the bead member 11, which is advantageous in improving the quality of the manufactured tire in terms of uniformity, for example.

Figure 6:
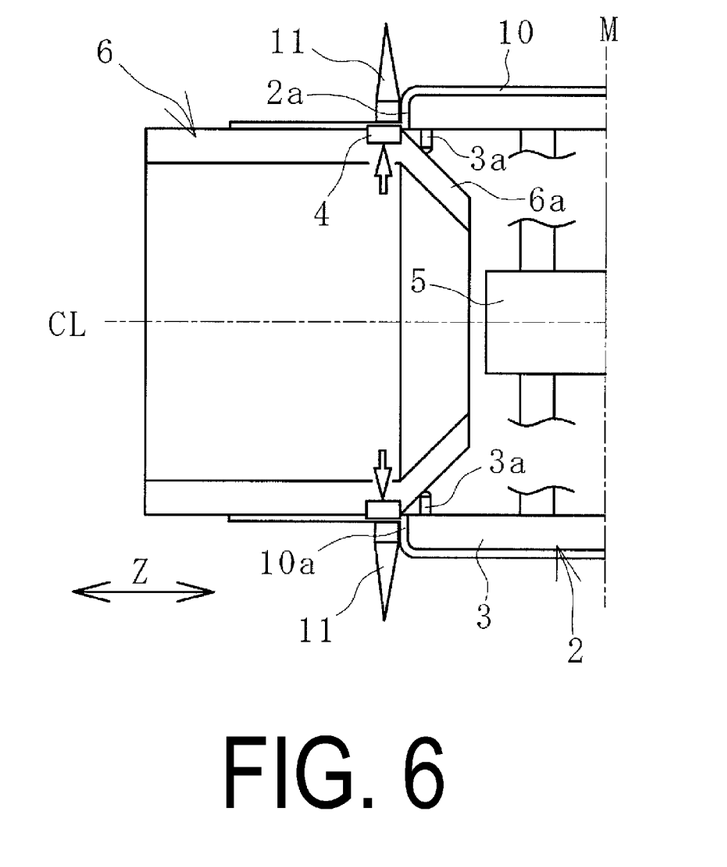
FIG. 6 is an explanatory diagram illustrating a state in which the bead member of FIG. 5 is held by a bead lock portion.

Next, as illustrated in FIG. 6, the bead lock portion 4 is moved to the lock position and holds the bead member 11. The movement of the bead member 11 is regulated by the side surface 2a of the forming drum 2 and the bead locking portion 4.

Figure 7:
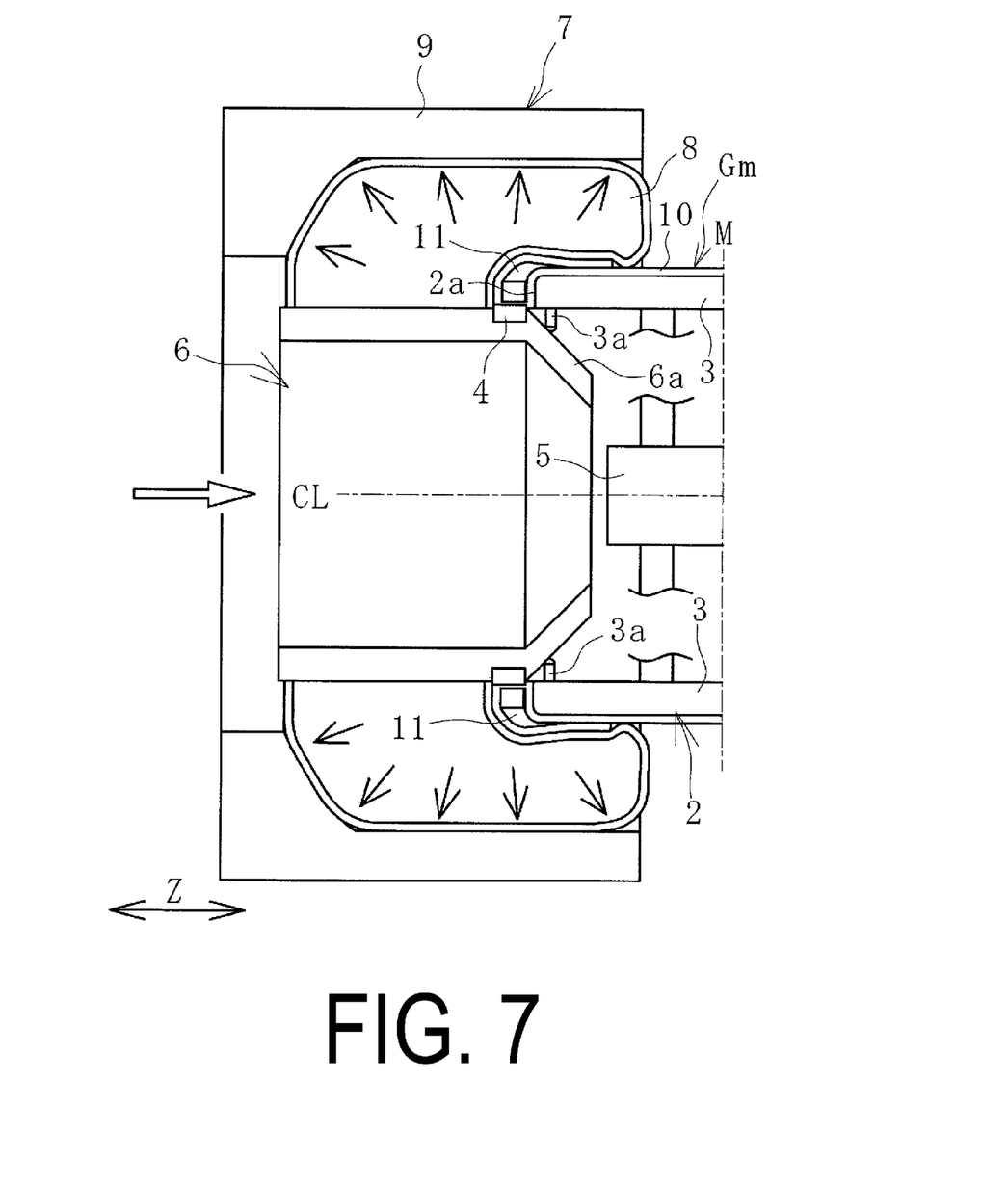
FIG. 7 is an explanatory diagram illustrating a state in which an end portion in the width direction of the band member in FIG. 6 is turned up.

Next, as illustrated in FIG. 7, the turn-up bladder 8 is expanded and the pusher ring 9 is moved in the drum axial direction to be disposed on the outer circumferential side of the turn-up bladder 8 expanded in an annular shape. In this way, both ends of the band member 10 in the drum axis direction are wrapped around the bead members 11 and turned up. The turned-up portion of the band member 10 is compression-bonded to the band member 10 opposite turned-up portion by the turn-up bladder 8 with its movement toward the outer circumferential side regulated by the pusher ring 9. In this manner, the turning up of the band member 10 is completed, and the intermediate green tire Gm illustrated in FIG. 8 is formed.

Figure 9:
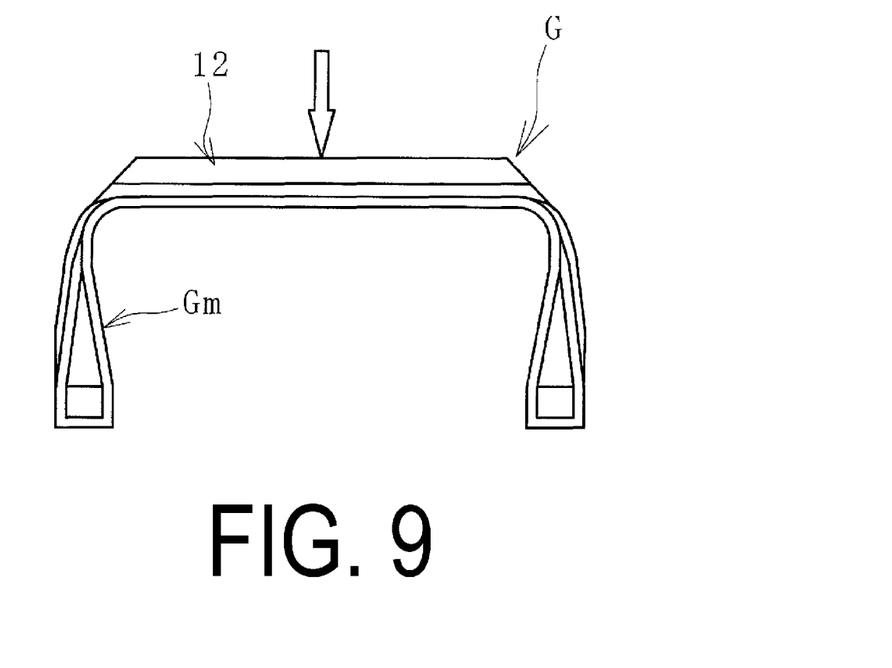
FIG. 9 is an explanatory diagram schematically illustrating the process of forming a green tire by bonding a remaining member to the intermediate green tire viewed in a cross-section.

Next, as illustrated in FIG. 9, the remaining members such as a belt member 12 are bonded to the intermediate green tire Gm, and a green tire G is completed. Various known methods can be employed to form the green tire G from the intermediate green tire Gm.

In this embodiment, the diameter-expanding operation of the forming drum 2 and the movement of the side portions 6 in the drum axial direction are in sync with one another, cleverly utilizing the projection portion 3a and the tapered surface 6a. The inclination angle of the tapered surface 6a with respect to the drum axial direction is approximately 45°. Thus, the amount of radial movement of the forming drum 2 and the amount of movement of each of the side portions 6 in the drum axial direction are generally the same. Accordingly, the step portion 10a formed in the band member 10 readily deforms in accordance with the side surface 2a of the forming drum 2.

The device for synchronizing the diameter-expanding operation of the forming drum 2 and the movement of the side portions 6 in the drum axial direction is not limited to the configuration described in this embodiment. For example, the movement of each of the side portions 6 in the drum axial direction can be synchronized with the diameter-expanding operation of the forming drum 2 using a servo motor that is electrically controlled via a control unit.

The invention claimed is:

1. A method for forming a pneumatic tire, comprising:
disposing a cylindrical band member on an outer circumferential side of an expandable and contractible forming drum and on outer circumferential sides of side portions disposed on both sides of the forming drum in a drum axial direction, forming a gap between the cylindrical band member and inner end portions of the side portions in a drum axial direction formed into a tapered shape that decreases in diameter extending inward in the drum axial direction, the gap further extending between the inner end portions of the side portions having the tapered shape and a planar end of a segment of the forming drum perpendicular to a surface of the outer circumferential sides of the side portions;
forming step portions in the band member by expanding the forming drum in diameter;
compression-bonding bead members onto the band member after forming the step portions, compressing-bonding the bead members further comprising compression-bonding the bead members on side surfaces of the forming drum by moving the bead members toward the step portions;
locking the bead members using a bead lock after compression-bonding the bead members on the side surfaces of the forming drum;
forming an intermediate green tire by wrapping the bead members by turning up both end portions of the band member in the drum axial direction; and
forming a green tire by bonding a remaining member to the intermediate green tire; wherein
the step portions of the band member are made to deform by being made to conform to the side surfaces of the forming drum and made to come into contact with the side surfaces by moving the side portions closer together in the drum axial direction in sync with a diameter-expanding operation of the forming drum.

2. The method for forming a pneumatic tire according to claim 1, wherein
a diameter-expanding operation and movement of the side portions in the drum axial direction are synchronized by moving a portion of the forming drum along a surface with the tapered shape, with the portion of the forming drum being in contact with the surface with the tapered shape.

* * * * *